United States Patent [19]

Morton

[11] Patent Number: 4,538,376
[45] Date of Patent: Sep. 3, 1985

[54] TRAP FOR MARINE ANIMALS

[76] Inventor: Roger H. Morton, 314 Sand Dune La., Holden Beach, N.C. 28462

[21] Appl. No.: 577,053

[22] Filed: Feb. 6, 1984

[51] Int. Cl.³ ............................................. A01K 69/06
[52] U.S. Cl. ...................................................... 43/100
[58] Field of Search .................... 43/100, 102, 103, 105

[56] References Cited

U.S. PATENT DOCUMENTS

| | | | |
|---|---|---|---|
| 1,927,599 | 9/1933 | Smith | 43/103 |
| 3,605,320 | 9/1971 | Wells | 43/100 |
| 3,906,654 | 9/1975 | Leslie | 43/100 |
| 4,070,788 | 1/1978 | Richcreek | 43/100 |
| 4,177,601 | 12/1979 | Morton | 43/102 |
| 4,429,659 | 2/1984 | Holyoak | 43/103 |

FOREIGN PATENT DOCUMENTS 562949 10/1932 Fed. Rep. of Germany ........ 43/102

OTHER PUBLICATIONS

National Fisherman–Apr., 1983, "Small But Intriguing Fishery Yields High-Quality Shrimp", pp. 27 and 29.

*Primary Examiner*—Gene P. Crosby
*Attorney, Agent, or Firm*—W. Thad Adams, III

[57] ABSTRACT

A marine trap 10 for shrimp, crabs, lobster and the like is disclosed which includes a frame structure 11 defining a top, bottom and a plurality of sides. A net 15 covers frame 11 on its top, bottom and sides to form an enclosure. A mouth 16 and net 15 is formed on the top of the trap 10 to permit entry of suitably sized marine animals. A pair of cables 20 and 21 are hooked by one end to opposite sides of the bottom of frame 11 and by their respective opposite ends to opposite sides of mouth 16 and define an inwardly extending, funnel-shaped top with mouth 16 at the apex of the funnel. To empty trap 10, cables 20 and 21 are released from mouth 16 and trap 10 is inverted. The net 15 falls downwardly into an outwardly extending funnel-shaped position permitting the contents of trap 10 to be poured through mouth 16.

7 Claims, 8 Drawing Figures

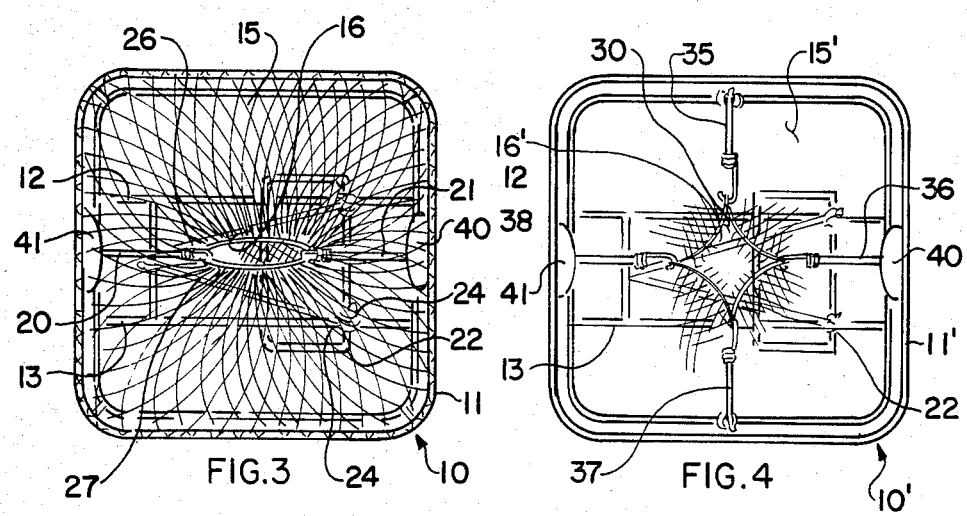
FIG. 3
FIG. 4
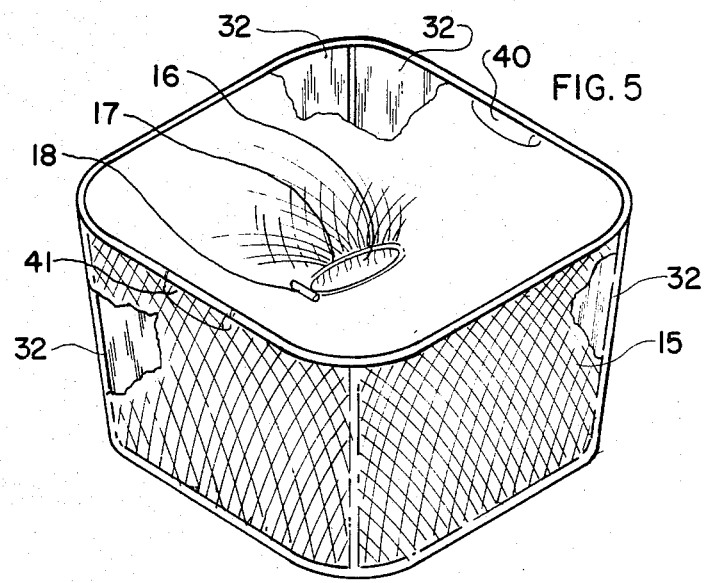
FIG. 5
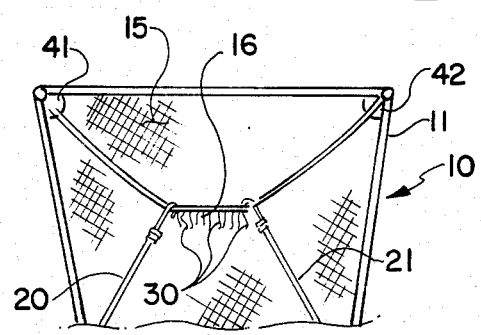
FIG. 6

TRAP FOR MARINE ANIMALS

TECHNICAL FIELD AND BACKGROUND OF THE INVENTION

This invention relates to a marine trap of the type used to trap shrimp, crabs, lobsters and other types of relatively small marine animals. The particular disclosure of this application is for a trap designed especially for trapping shrimp and, with minor modifications, lobster and crab. However, it will be understood that the trap is used for catching virtually any type of marine life which can be induced to enter the trap.

Historically, shrimp have been harvested from the ocean by means of large nets. Typically, these nets are suspended on outboard booms and towed through relatively shallow water by large, powerful trawlers. The nets drag along the sea floor for a specified period of time after which they are raised and the contents collected. This method of shrimp harvesting is relatively expensive and inefficient for numerous reasons. First, dragging for shrimp with nets is limited to relatively flat, smooth sea bottom in order to prevent the nets from tearing and snagging. Also, nets must be used only in relatively shallow water.

Large, powerful boats are required to tow the nets through the water for long periods of time before they are raised and the contents collected.

Nets will sweep up any and all objects in its path, including not only shrimp and other types of sea life but rocks, mud, shells and debris. When the contents of the net are dumped into the boat, all of this undesirable material must be sorted from the shrimp and thrown overboard. Furthermore, the shrimp may themselves be packed under tons of rock, shells and fish and therefore may be broken, crushed or otherwise damaged. Pieces of shrimp and damaged whole shrimp typically bring a much lower price than do undamaged shrimp.

Finally, the drag nets themselves are large and very expensive. They need constant repair since they are quite often torn by rocks and other objects which they may encounter while being dragged across the sea floor.

For all these reasons, shrimp trapping is becoming a more economically feasible means of harvesting shrimp.

Many traps can be set from a relatively small boat. The traps can be dropped into areas having a rocky or uneven seafloor—places where most shrimp live. Most sorting can be eliminated and a higher quality of shrimp can be delivered to market.

Shrimp are currently trapped by using one of a relatively few types of shrimp traps. Some are similar to lobster traps in that they are constructed of wooden slats with a hinged top opening with serpentine entrances through which the shrimp can enter but not easily exit. This type of trap is relatively heavy and since they cannot be nested together for storage, take up a substantial amount of deck space on a boat. For this reason, a relatively large boat must be used or the number of traps being laid at any one time must be limited.

Other known shrimp traps are similar to oversized egg cartons. They are constructed of plastic material and hinged on one side with holes formed in the plastic to permit water to drain out. This type of trap has a fixed-size mouth with rigid, breakable teeth angled into the interior of the trap to keep the shrimp from exiting. While these traps can be nested when open, they require a large winch to recover since the water drains from them relatively slowly. Also, the teeth are breakable and the mouth is of a single size which cannot be adjusted to accommodate trapping for different sized marine animals. Also, the traps are relatively expensive to make and to repair.

SUMMARY OF THE INVENTION

Therefore, it is an object of the invention to provide an improved marine animal trap which is lightweight, easy to manufacture, maintain and repair.

It is another object of the present invention to provide a marine animal trap which is easily nestable and which can be carried in relatively large numbers on a small boat.

It is another object of the present invention to provide a marine animal trap which is particularly useful in deep water and in areas where the sea floor is uneven or rocky.

It is yet another object of the present invention to provide a marine animal trap from which the contents can quickly be poured through the same opening through which the marine animals entered the trap.

It is yet another object of the present invention to provide a marine animal trap having a mouth which is easily adjustable for both size and shape so that different sizes and types of marine animals can be selectively trapped.

These and other objects and advantages of the present invention are achieved in the preferred embodiments of the invention disclosed below by providing a frame structure defining a top, bottom and a plurality of sides. A net covers the frame structure on its top, bottom and sides to form an enclosure. Entry means are provided and comprise a net across the top of the frame having a relatively small mouth therein for permitting entry of suitably sized marine animals.

Releasable tension means are provided for biasing the net covering the top of the frame downwardly into the frame toward its bottom to define an inwardly extending funnel-shaped top with the mouth at the apex of the funnel. The funnel-shaped top cooperates with the side and bottom of the frame to substantially prevent the marine animals from exiting the mouth while the top is under tension. Once the tension means are released, the trap can be inverted for emptying. The net covering the top of the frame extends outwardly in a funnel-shape from the enclosure to permit the contents to be poured from the enclosure through the mouth. Preferably, the releasable tension means comprise stretchable cables secured to the frame and having hooks on one end thereof for hooking through the net on opposite sides of the opening and stretching the net in opposite direction whereby the mouth is relatively long and narrow.

In accordance with another embodiment of the present invention, the tension means comprise four stretchable cables secured to the frame and having hooks on one end thereof for hooking through the net at four points around the mouth whereby the mouth is substantially rectangular in shape and specifically adapted for trapping crabs and lobsters.

Preferably, the marine trap includes a drawstring threaded through the opening of the net on the top of the frame for adjusting the mouth to a pre-determined size.

Also, the marine trap preferably includes diversion means positioned around the mouth to provide an effective, but not physical, barrier against marine animals exiting from the enclosure. According to the embodiment disclosed herein, the diversion means comprise a plurality of relatively long, flexible strands secured to the net around the periphery of the mouth and extending downwardly into the enclosure and adapted to move about in the current to form the appearance of a barrier.

In accordance with one embodiment of the invention disclosed herein, the marine trap includes opaque panels attached to and extending around the side of the enclosure to provide dark areas away from the mouth of the trap toward which marine animals instinctively gravitate. Also, float means are carried by the frame near its top to provide buoyancy to the top of the trap and to ensure that the trap settles upright on the underwater floor.

BRIEF DESCRIPTION OF THE DRAWINGS

Some of the objects of the invention have been set forth above. Other objects and advantages of the invention will appear as the description of the invention proceeds, when taken in conjunction with the following drawings, in which:

FIG. 3 is a top plan view of the trap shown in FIG. 1;

FIG. 4 is a top plan view of another embodiment of the invention wherein the mouth of the trap is tensioned at four points to define a rectangular shape;

FIG. 5 is an embodiment of the invention which includes opaque panels around the sides of the trap enclosure;

FIG. 6 is an enlarged close-up view of the mouth of the trap shown in FIG. 1 and illustrating the diversion means positioned around the mouth;

DESCRIPTION OF THE PREFERRED EMBODIMENT

Figure 1:
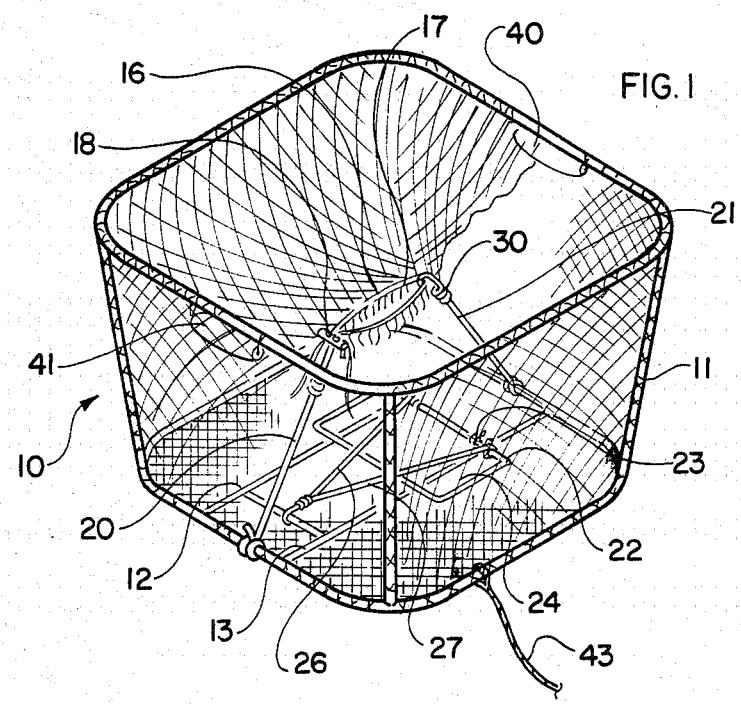
FIG. 1 is a perspective view of a preferred embodiment of the marine trap according to this invention.

Referring now specifically to the drawings, a preferred embodiment of the marine trap according to the present invention is shown in FIG. 1 and generally designated as broad reference numeral 10. Trap 10 comprises a frame 11 which is preferably constructed of suitably formed iron or steel reinforcing bar welded together to form a box-like structure. Also welded to the bottom of frame 11 are two parallel and longitudinally extending reinforcing members 12 and 13. These give needed rigidity to frame 11 and also add additional weight to the bottom of frame 11 so that trap 10 tends to settle onto the sea floor on its bottom. Frame 11 is enclosed on its bottom, four sides and top by a flexible, mesh net 15 having openings of a suitable size for the animals to be trapped.

Figure 2:
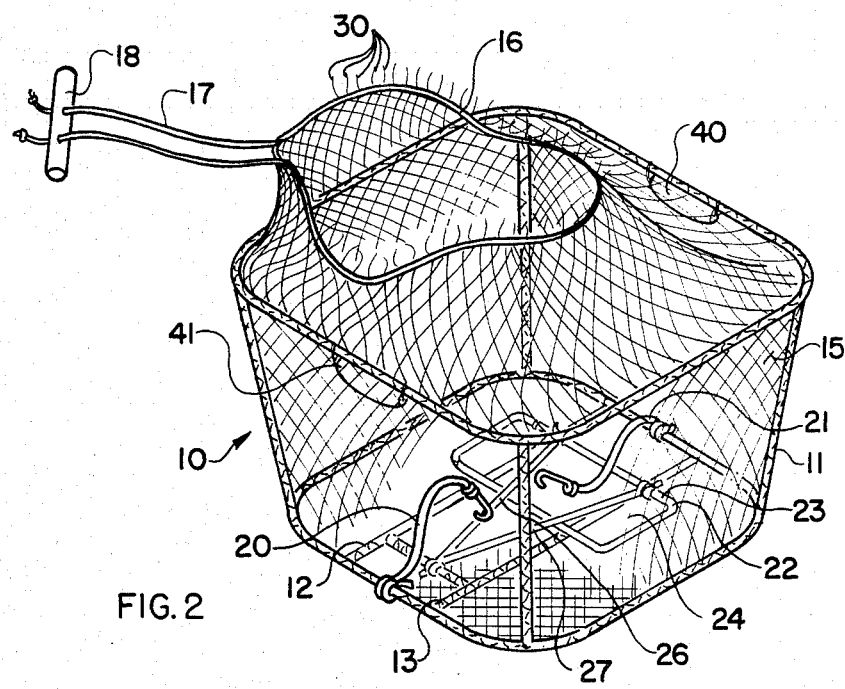
FIG. 2 is a view similar to that in FIG. 1, showing the tension on the trap mouth released.
Figure 7:
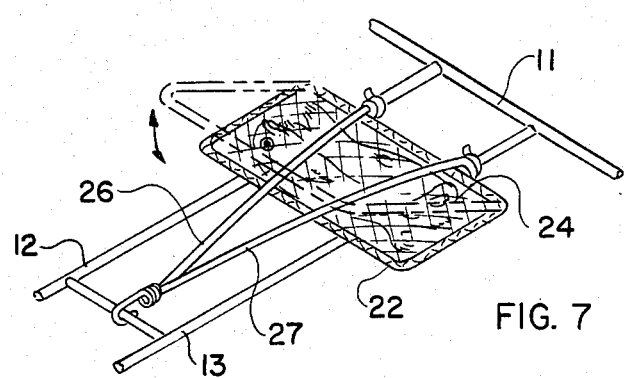
FIG. 7 is an enlarged side view of the bait holding means.

Entry means comprising a mouth 16 is formed in the net on the top of frame 11. As is best shown in FIG. 2, the mouth is threaded with a drawstring 17. Drawstring 17 is threaded through a locking handle 18. By pulling the desired amount of drawstring 17 through handle 18 and tying it onto handle 18, the mouth 16 can be adjusted precisely to the desired size.

Referring again to FIG. 1, tension means, comprising a pair of elastic cables 20 and 21 with hooks on both ends are hooked by one end to opposite sides of the bottom of frame 11 and by their respective opposite ends to opposite sides of mouth 16. As is shown in FIG. 1 and also in FIG. 3, mouth 16 is stretched into an elongated shape which is relatively long and narrow. This shape is particularly suited for trapping shrimp. As is also shown in FIGS. 1 and 3, the elastic cables 20 and 21 pull the net 15 on the top of frame downwardly into the enclosure, forming a funnel-shaped top. Positioned directly below the mouth 16 is a bait holder which comprises a small, iron frame 22 secured by a pair of hinges 23 to the bottom of frame 11. Frame 22 is covered with flexible mesh netting 24 and is biased in its closed position by a pair of elastic cables 26 and 27. Bait is loaded into the bait holder by pulling iron frame 22 upwardly against the bias of cables 26 and 27 enough to insert a piece of bait therebeneath. Then the frame 22 is released and it springs back into position over the bait.

As is shown in FIG. 1, mouth 16 extends inwardly into close proximity to where the bait is to be positioned in the bait holder. This induces the shrimp to move towards mouth 16 and through mouth 16 into the enclosure towards the bait.

Once the shrimp are within the enclosure, they are prevented from exiting the enclosure by diversion means, best shown in FIG. 6. The diversion means comprise a plurality of relatively long, flexible strands 30 which are looped up through net 15 around the periphery of mouth 16. As is shown in FIG. 6, the elongate strands extend downwardly into the enclosure of trap 10. The moving current of the water moves them about and to the shrimp forms the appearance of a barrier to mouth 16 away from which the shrimp move.

The shrimp are also encouraged to move away from mouth 16 by dark, opaque colored panels 32 which extend around the four sides of the trap, as is shown in FIG. 5. Since shrimp and other similar marine animals naturally prefer dark places, they move toward the dark colored panels and away from mouth 16. Panel 32 is preferably positioned withih the trap behind netting 15. Since the opaque panels 32 do not extend across the top or bottom, free drainage of water from the trap as it is lifted from the water is not inhibited in any way.

Referring now to FIG. 4, a trap 10' is disclosed and comprises the use of four elastic cables 35-38. These cables are connected by hooks on one end to frame 11'. and by hooks on their opposite ends to net 15' at mouth 16'. By pulling mouth 16' in four substantially perpendicular directions, a substantially rectangular opening is defined through which lobsters, crabs and similar marine animals can freely pass. Although not specifically shown, the diverting strands 30 can also be positioned around the sides of mouth 16'.

Figure 8:
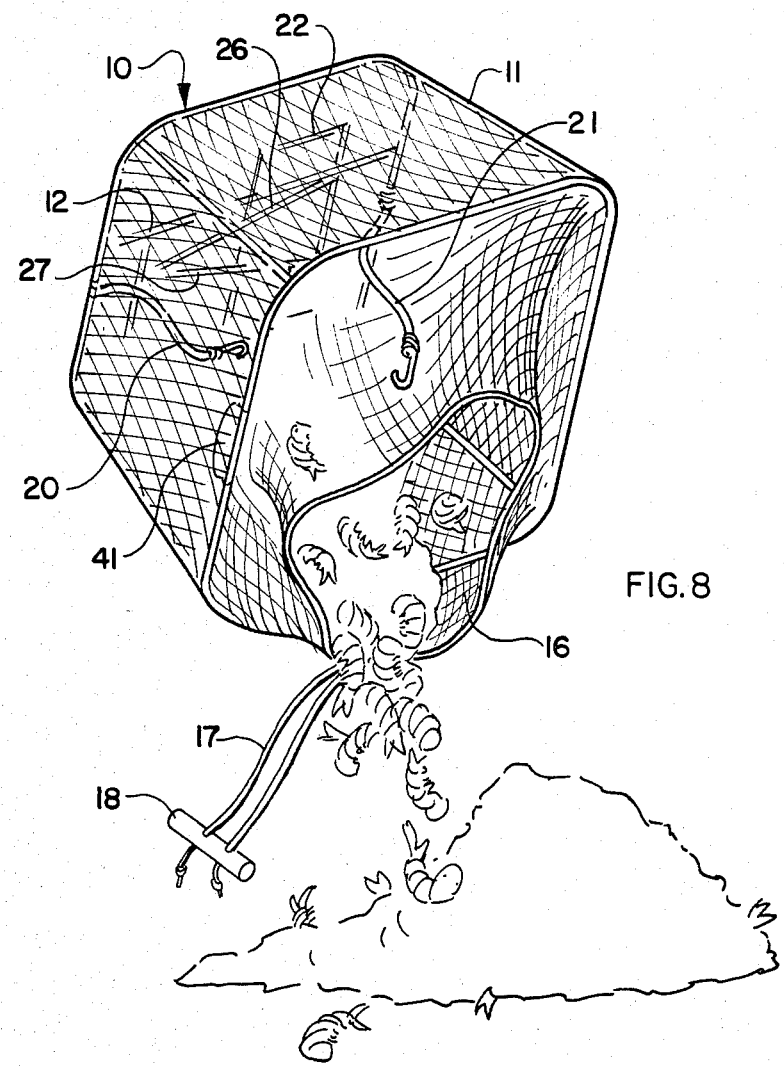
FIG. 8 is a view of the trap in its inverted position with the mouth serving as a pouring funnel to discharge the contents of the trap.

Referring now to FIG. 8, the configuration of trap 10 during emptying is shown. To empty, cables 20 and 21 are unhooked from the net around mouth 16. As trap 10 is inverted, the flexible net 15 extends outwardly from trap 10 forming a discharge funnel, permitting the contents of the trap to exit through mouth 16. Ordinarily, it is not necessary to loosen the drawstrings 17 unless a relatively large object is trapped in the mouth sideways. After emptying, trap 10 is placed on its bottom and by simply reconnecting cables 20 and 21 to opposite sides of mouth 16, and checking to insure the bait remains in the bait holder, the trap is ready for reuse. To assist the trap in positioning itself on the sea floor and an upright position, floats 40 and 41 are secured to opposite sides of frame 11 adjacent the top side thereof. Usually, a number of traps 10 are strung together in widely spaced-apart relation on a rope, such as rope 43 shown in FIG. 1.

A marine animal trap is described above. Various details of this invention may be changed without departing from its scope. Furthermore, the foregoing description of a preferred embodiment of this trap is provided for the purpose of illustration only and not for the purpose of limitation—the invention being defined by the claims.

I claim:

1. A marine trap for shrimp, crabs, lobster and the like, comprising:
   (a) a frame structure defining a top, bottom and a plurality of sides;
   (b) a net covering said frame on its top, bottom and sides to form an enclosure;
   (c) entry means, comprising said net across the top of said frame having a relatively small mouth therein for permitting entry of suitably sized marine animals;
   (d) releasable tension means for biasing said net covering the top of the frame downwardly into the frame toward the bottom thereof to define an inwardly extending funnel-shaped top witn said mouth at the apex of the funnel, said funnel-shaped top cooperating with the sides and bottom of said frame to substantially prevent the marine animals from exiting the mouth while said top is under tension, and then said tension means is released and said trap inverted for emptying, said net covering the top of said frame extending outwardly in a funnel-shape from said enclosure to permit the contents to be poured from the enclosure through the mouth;
   (e) bait holding means carried by the frame within the enclosure.

2. A marine trap according to claim 1 wherein said releasable tension means comprise stretchable cables secured to said frame and having hooks on one end thereof for hooking through the net on opposite sides of the opening therein and stretching said net in opposite directions whereby said mouth is relatively long and narrow.

3. A marine trap according to claim 1 wherein a drawstring is threaded through the opening of said net for adjusting the mouth to a pre-determined size.

4. A marine trap according to claim 1 and including diversion means positioned around said mouth to provide an effective, but not physical, barrier against animals exiting from the enclosure, said diversion means comprising a plurality of relatively long, flexible strands secured to the net around the periphery of the mouth and extending downwardly into the enclosure and adapted to move about in the current to form the appearance of a barrier to said mouth.

5. A marine trap according to claim 1 wherein said tension means comprise four stretchable cables secured to said frame and having hooks on one end thereof for hooking through the net at four points around the mouth whereby said mouth is substantially rectangular in shape and specifically adapted for trapping crabs and lobsters.

6. A marine trap according to claim 1 and including float means carried by said frame near its top to provide buoyancy to the top of the trap and ensure that the trap settles upright on the underwater floor.

7. A marine trap according to claim 1 and including opaque panels attached to and extending around the sides of the enclosure to provide dark areas away from the mouth of the trap towards which marine animals instinctively gravitate.

* * * * *